US009475553B2

(12) United States Patent
Roger et al.

(10) Patent No.: US 9,475,553 B2
(45) Date of Patent: Oct. 25, 2016

(54) WING RELEASING SYSTEM FOR A NAVIGATION CONTROL DEVICE

(71) Applicant: SERCEL, Carquefou (FR)

(72) Inventors: Thierry Roger, Nantes (FR); Christophe L'Her, Loperhet (FR); Jean-Jacques Vignaux, Carquefou (FR); Christophe Coutineau, Vertou (FR); Dominique Barbot, Locmaria Plouzane (FR); Stephane Rousseau, La Chapelle sur Erdre (FR)

(73) Assignee: SERCEL, Carquefou (FR)

( * ) Notice: Subject to any disclaimer, the term of this patent is extended or adjusted under 35 U.S.C. 154(b) by 11 days.

(21) Appl. No.: 14/508,559

(22) Filed: Oct. 7, 2014

(65) Prior Publication Data
US 2015/0096484 A1 Apr. 9, 2015

(30) Foreign Application Priority Data

Oct. 7, 2013 (EP) .................................... 13306384

(51) Int. Cl.
*B63G 8/14* (2006.01)
*B63G 8/24* (2006.01)
*B63B 21/66* (2006.01)
*G01V 1/38* (2006.01)

(52) U.S. Cl.
CPC ............ *B63B 21/66* (2013.01); *G01V 1/3826* (2013.01)

(58) Field of Classification Search
CPC ............ G01V 1/3835; G01V 1/3843; G01V 1/3826; B63B 21/66
USPC ................. 114/244, 245, 246, 247
See application file for complete search history.

(56) References Cited

U.S. PATENT DOCUMENTS

| 6,011,752 | A * | 1/2000 | Ambs ................ G01V 1/3826 |
| | | | 114/242 |
| 6,525,992 | B1 | 2/2003 | Olivier et al. |
| 7,080,607 | B2 | 7/2006 | Hillesund et al. |
| 7,206,254 | B2 | 4/2007 | Oliver et al. |
| 7,933,163 | B2 | 4/2011 | Fossum et al. |
| 2008/0008033 | A1 | 1/2008 | Fossum et al. |
| 2008/0192570 | A1 | 8/2008 | Lennart et al. |
| 2009/0204274 | A1 | 8/2009 | Bittleston |
| 2010/0239367 | A1 | 9/2010 | Olivier |

FOREIGN PATENT DOCUMENTS

EP 0909701 A2 4/1999
WO 2009088291 A1 7/2009

OTHER PUBLICATIONS

European Search Report and Written Opinion dated Mar. 14, 2014 for corresponding European Application No. 13306384, filed Oct. 7, 2013.

* cited by examiner

*Primary Examiner* — Anthony Wiest
(74) *Attorney, Agent, or Firm* — David D. Brush; Westman, Champlin & Koehler, P.A.

(57) ABSTRACT

A wing releasing system is provided for releasing at least one wing of a set of wing or wings of a navigation control device. The navigation control device is adapted for controlling depth and/or lateral position of a towed acoustic linear antenna and includes a body to which is attached the set of wing or wings. The wing releasing system includes: a releasing decision circuit, for generating a release request signal when detecting that a foreign object is caught by at least one wing of the set of wing or wings; and an actuator comprised in the navigation control device, for releasing from the body the at least one wing of the set of wing or wings, when receiving the release request signal.

10 Claims, 4 Drawing Sheets

WING RELEASING SYSTEM FOR A NAVIGATION CONTROL DEVICE

1. FIELD OF THE DISCLOSURE

The field of the disclosure is the acquisition of geophysics data. It deals with the equipments required in order to study the seabed and its sediment layers properties.

More specifically, the disclosure relates to a wing releasing system for a navigation control device (commonly referred to as "bird"), such a navigation control device being adapted for controlling the depth and/or the lateral position of a towed acoustic linear antenna (commonly referred to as "streamer").

The disclosure can be applied notably to the oil prospecting industry using seismic method (sea oil survey), but can be of interest for any other field which requires a system performing geophysics data acquisition in a marine environment.

2. TECHNOLOGICAL BACKGROUND

It is sought more particularly here below in this document to describe problems existing in the field of seismic data acquisition for oil prospecting industry. The disclosure of course is not limited to this particular field of application but is of interest for any technique that has to cope with closely related or similar issues and problems.

Figure 1:
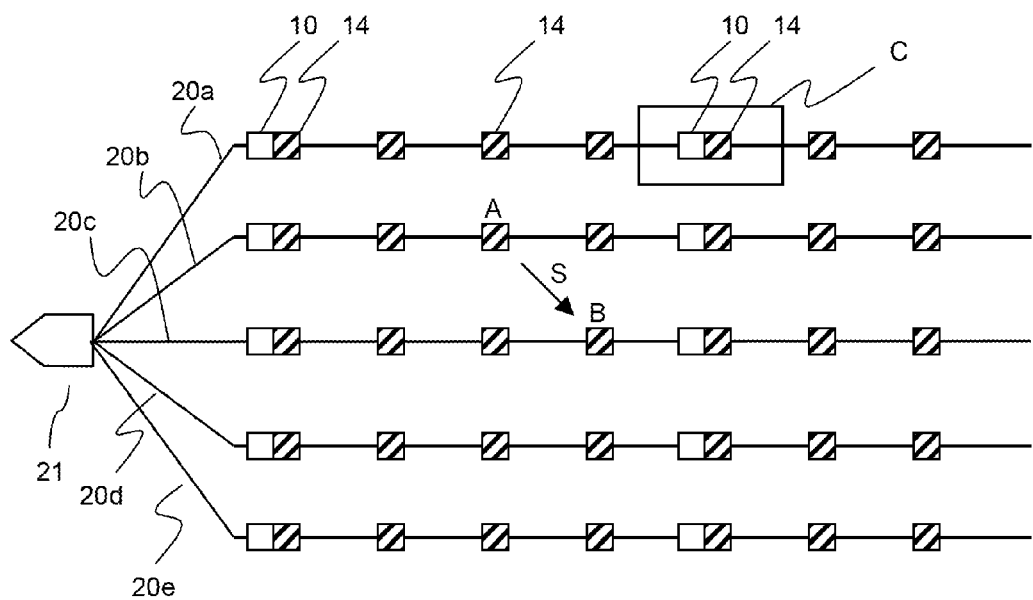

The operations of acquiring seismic data on site conventionally use networks of seismic sensors, like accelerometers, geophones or hydrophones. We consider below the context of seismic data acquisition in a marine environment, in which the seismic sensors are hydrophones. The hydrophones are distributed along cables in order to form linear acoustic antennas normally (also referred to as "streamers" or "seismic streamers"). As shown in FIG. 1, the network of seismic streamers 20a to 20e is towed by a seismic vessel 21. The hydrophones are referenced 16 in FIG. 2, which illustrates in detail the block referenced C in FIG. 1 (i.e. a portion of the streamer referenced 20a).

The seismic method is based on an analysis of reflected seismic waves. Thus, to collect geophysical data in a marine environment, one or more submerged seismic sources are activated in order to propagate omnidirectional seismic wave trains. The pressure wave generated by the seismic source passes through the column of water and insonifies the different layers of the seabed. The reflected seismic waves (i.e. reflected acoustic signals) are then detected by the hydrophones distributed over the length of the seismic streamers. These acoustic signals are processed and retransmitted by telemetry from the seismic streamers to the operator station situated on the seismic vessel, where the processing of the raw data is carried out (in an alternative solution, the seismic acoustic signals are stored for a later processing).

During seismic surveys, it is important to precisely locate the streamers in particular for:
monitoring the position of the hydrophones (distributed along the seismic streamers) in order to obtain a satisfactory precision of the image of the seabed in the exploration zone;
detecting the movements of the streamers with respect to one another (the streamers are often subjected to various external natural constrains of variable magnitude, such as the wind, waves, currents); and
monitoring the navigation of streamers, in particular in a situation of bypassing an obstacle (such as an oil barge).

Figure 2:
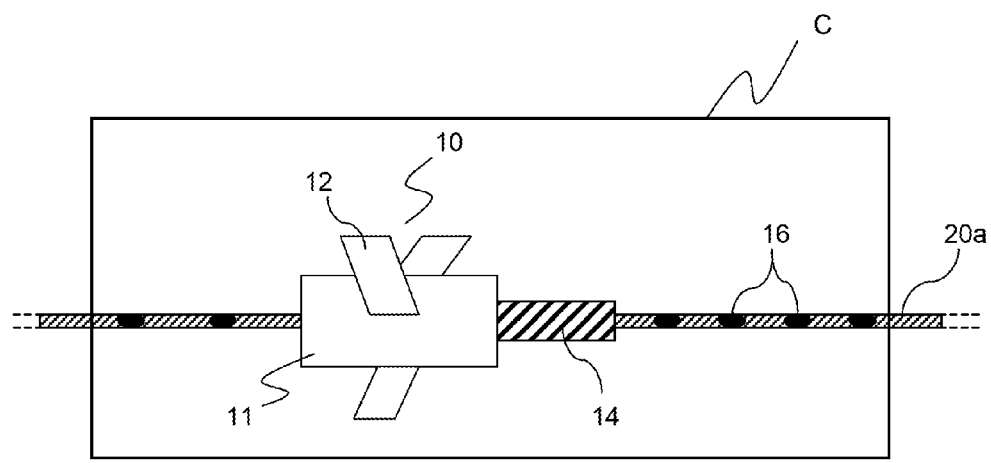

Control of the positions of streamers lies in the implementation of navigation control devices (also referred to as "birds") (white squares referenced 10 in FIG. 1). They are installed at regular intervals (every 300 meters for example) along the seismic streamers. The function of those birds is to guide the streamers between themselves. In other words, the birds are used to control the depth as well as the lateral position of the streamers. For this purpose, and as illustrated in FIG. 2, each bird 10 comprises a body 11 equipped with motorized pivoting wings 12 (or more generally means of mechanical moving) making it possible to modify the position of the streamers laterally between them (this is referred to a horizontal driving) and drive the streamers in immersion (this is referred to a vertical driving).

Seismic marine acquisition is usually performed close to the coast where fishermen have installed fishing nets. Some areas over the world are full of thousands of nets, which are not identified. Despite fishermen are requested to remove the nets and chase boats try to detect presence of nets, they are still many nets at sea, when the seismic vessel is working. Seismic streamers towed by vessel can easily catch fishing nets. The slanted shape of the streamers, in the current acquisition programs, increases the risk for a streamer to catch nets that float below the surface because the water column is more important. Since streamers are smooth, nets (or any inconvenient foreign objects) are sliding down the streamer, until they get caught by a prominent device which most often is a bird.

When a fishing net is caught by a bird:
drag increase on the streamer;
noise increases and can exceed the maximum noise tolerance (i.e. noise is too high compared with the useful seismic signal), which generates downtime;
the bird can no more control depth with effect on the cable that can go out of the specified depth, which generates downtime;
the bird can be unstable and can twist, with effect on the streamer that can twist and be damaged, which generates downtime.

There are several kinds of birds in the market, whose behavior is not the same in the presence of a net (or any inconvenient foreign object).

Birds of a first type (called "Bird In Line" or "BIL") are placed in series with the streamer, using connectors that supply power and data communication. See for example the following patent documents: U.S. Pat. No. 7,933,163, U.S. Pat. No. 7,206,254, US2009/0204274 and U.S. Pat. No. 7,080,607. These "BIL" comprise a body, in series with the streamer, and wings, which are interdependent with the body. These birds comprise, for each wing, a passive mechanical fuse which breaks to prevent the transmission of excessive mechanical stress to the bird and hence to the streamer. If a fishing net is caught by a wing, only this wing is released.

Birds of a second type (called "Bird In Parallel" or "BIP") are placed in parallel with the streamer, using quick latches attached to the streamer. See for example the following patent document: U.S. Pat. No. 6,525,992. Power is supplied by internal battery and data communication is done through contactless magnetic coils. If a fishing net is caught by a wing, quick latches are acting as passive mechanical fuse to release the entire bird (body and wings). A rope fixed to the streamer allows the bird to remain attached to the streamer when released.

Birds of a third type (e.g. Sercel's product called "Nautilus®" (registered trademark)) can be seen as a hybrid solution since they comprise (see bird 10 of FIG. 3): at least one module (not shown), placed in series along the streamer (not shown), and a body (tubular frame element) 11, freely rotating around the at least one module and placed in parallel with the streamer. Three wings are attached to the body 11: two motorized upper wings 12a, 12b and a lower non-motorized wing (keel) 12c. In a first embodiment, if a fishing net is caught by the bird, it is not expected to release one or several wings (there is a wing loss only by breaking). In a second embodiment, if a fishing net is caught by a wing, only this wing is released using a passive mechanical fuse (as for the birds of the first type).

All these birds (first, second or third type) have drawbacks.

Indeed, the use of a passive mechanical fuse (for a wing in the case of birds of the first or third type, or for the whole bird in the case of birds of the second type) is not a reliable solution since the passive mechanical fuse can be seized or neutralized depending how fishing nets (or any inconvenient foreign objects) are attached to the bird and/or to the streamer. This results in a non-activation of the passive mechanical fuse when required. Inversely, the passive mechanical fuse (for the entire bird or a given wing) can be activated when not required (e.g. in case of heavy seas, the entire bird or the given wing may be released due to a severe load on the wing caused by the swell, when the entire bird or the given wing should remain attached to the streamer).

Moreover, when the whole bird or a given wing is released, lateral and/or vertical controls (previously carried out by the bird) are lost or no more managed correctly.

The birds of the third type ("Nautilus®" solution) become unstable when a fishing net is caught in the wings. They roll over the stability domain and twist around the streamer. They finally twist also the streamer on which they are fixed, until damaging the streamer.

3. SUMMARY

A particular embodiment of the disclosure proposes a wing releasing system for releasing at least one wing of a set of wing or wings of a navigation control device, the navigation control device being adapted for controlling the depth and/or the lateral position of a towed acoustic linear antenna and comprising a body to which is attached the set of wing or wings. The wing releasing system comprises:
- a releasing decision circuit, for generating a release request signal when detecting that a foreign object is caught by at least one wing of the set of wing or wings; and
- an actuator comprised in the navigation control device, for releasing from the body said at least one wing of the set of wing or wings, when receiving said release request signal.

The general principle is to take an active approach rather than the passive approach of the prior art. Indeed the prior art solutions use a passive mechanical fuse to release the entire bird (birds of the second type) or only a wing (birds of the first type), or do not provide any mechanism for releasing the bird or a wing (birds of the third type). The proposed solution is an active approach since it uses an actuator which is activated if a release request signal is generated (i.e. if the releasing decision circuit detects that a foreign object (e.g. a fishing net) has been caught by at least one wing. This allows to optimally maintain a full integrity of the streamer (the streamer is protected from twisting and damages), and also a partial integrity of the bird (the wing is released without damage), in presence of fishing nets or any inconvenient foreign objects, while being reliable (avoiding unwanted quick release of the wing), autonomous (automatic and quick release of the wing) and cost efficient. Another advantage of the proposed active approach is that the wing releasing system can be easily modified to adapt to any environment (e.g. by a simple software update of the releasing decision circuit), unlike a constraining mechanical change in case a passive mechanical fuse is used.

According to a particular feature, said releasing decision circuit comprises:
- means for obtaining at least one measure of a parameter representative or related to a load applied on said at least one wing of the set of wing or wings;
- means for deciding, automatically or through a man-machine interface, whether a foreign object is caught by said at least one wing of the set of wing or wings, based on said at least one measure; and
- means for generating the release request signal if said means for deciding have decided that a foreign object is caught.

Since the releasing decision circuit takes a decision (i.e. generates the release request signal which is then used as an input by the actuator) as a function of at least one measure, this decision is more precise and appropriate than the release obtained in the prior art with a passive mechanical fuse. This decision can be taken automatically (e.g. when the releasing decision circuit is comprised in the navigation control device or in a management system on board a vessel) or through a man-machine interface (e.g. when the releasing decision circuit is comprised in a management system on board a vessel).

According to a particular feature, said means for deciding comprise signal processing means, with programmable settings.

This allows to limit the false detections and to have a programmable solution. With the programmable settings, there is no need for a mechanical resizing (contrary to a passive mechanical fuse).

According to a particular feature, said at least one measure belongs to the group comprising:
- measures, from a load sensor comprised in the navigation control device, of a load applied on said at least one wing of the set of wing or wings;
- measures of a noise on data from one or several hydrophones distributed along the towed acoustic linear antenna;
- measures of a noise on the towed acoustic linear antenna; and
- measures of a motor consumption of at least one motorized wing of the set of wing or wings.

This list of measures is not exhaustive.

In a first implementation, the releasing decision circuit is comprised in the navigation control device.

In this first implementation, the whole wing releasing system is comprised in the navigation control device, and the latter can operate independently (the releasing decision is taken locally, in the navigation control device).

In a first example of the first implementation, the navigation control device comprises a module placed in series along the towed acoustic linear antenna, said body freely rotates around said module. Said releasing decision circuit is comprised in said body, in said module or in said at least one wing of the set of wing or wings.

This case is for example an adaptation of the existing birds of the third type (e.g. Sercel's product called "Nautilus®").

In a second example of the first implementation, the body of the navigation control device comprises a module placed in series along the towed acoustic linear antenna. Said releasing decision circuit is comprised in said module or in said at least one wing of the set of wing or wings.

This case is for example an adaptation of the existing birds of the first type ("Bird In Line").

In a second implementation, said releasing decision circuit is comprised in a management system on board a vessel, and the wing releasing system further comprises:
- a transmitting circuit, comprised in the management system, for transmitting the release request signal to the actuator, and
- a receiving circuit, comprised in the navigation control device, for receiving the release request signal.

In this second implementation, the wing releasing system is distributed: the actuator is comprised in the navigation control device and the releasing decision circuit is on board the vessel. The navigation control device does not operate independently since the releasing decision is taken on board the vessel.

According to a particular feature, the wing releasing system comprises a main battery, for powering the releasing decision circuit and the actuator.

Thus the proposed solution can be completely autonomous.

According to a particular feature, said releasing decision circuit, said actuator and said main battery are contained in a watertight housing comprising a watertight connector, and said watertight connector is connected to said releasing decision circuit, said actuator and said main battery, and comprises means for cooperation with:
- a shunting dongle, in order to deactivate the actuator and disconnect the main battery from the releasing decision circuit;
- a passing dongle, in order to activate the actuator and connect the main battery to the releasing decision circuit;
- a bench, in order to deactivate the actuator, charge the main battery and exchange data with the releasing decision circuit.

Thus the watertight connector is easy to use during transportation (with the shunting dongle), during acquisition phases (with the passing dongle) and when the bird is brought on-board (for connection to the bench).

According to a particular feature, the releasing decision circuit comprises an embedded memory to log events and record load cases.

This enable learning of use cases and make the releasing decision circuit more appropriate.

Another particular embodiment of the disclosure proposes a method for releasing at least one wing of a set of wing or wings of a navigation control device adapted for controlling the depth and/or the lateral position of a towed acoustic linear antenna and comprising a body to which is attached the set of wing or wings, the method comprising the following steps:
- generating a release request signal when detecting that a foreign object is caught by at least one wing of the set of wing or wings; and
- releasing from the body said at least one wing of the set of wing or wings, using an actuator comprised in the navigation control device, when said release request signal is generated.

4. LIST OF FIGURES

Figure 3:
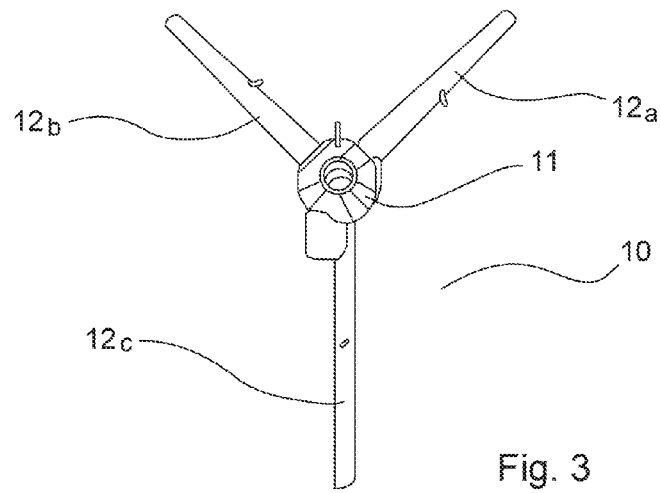
Figure 4:
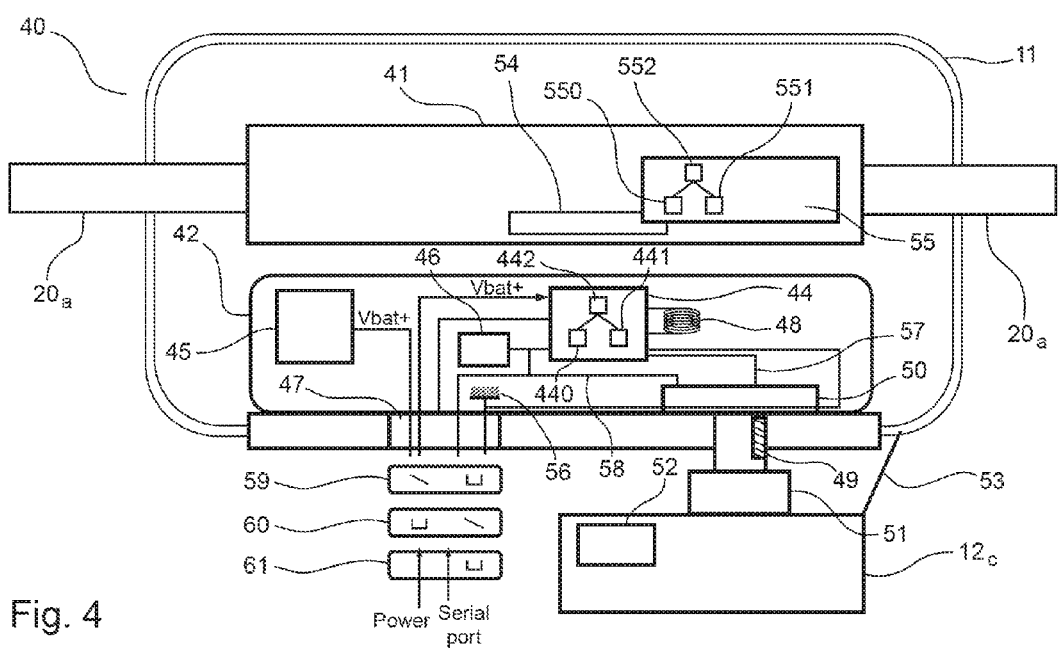
Figure 5:
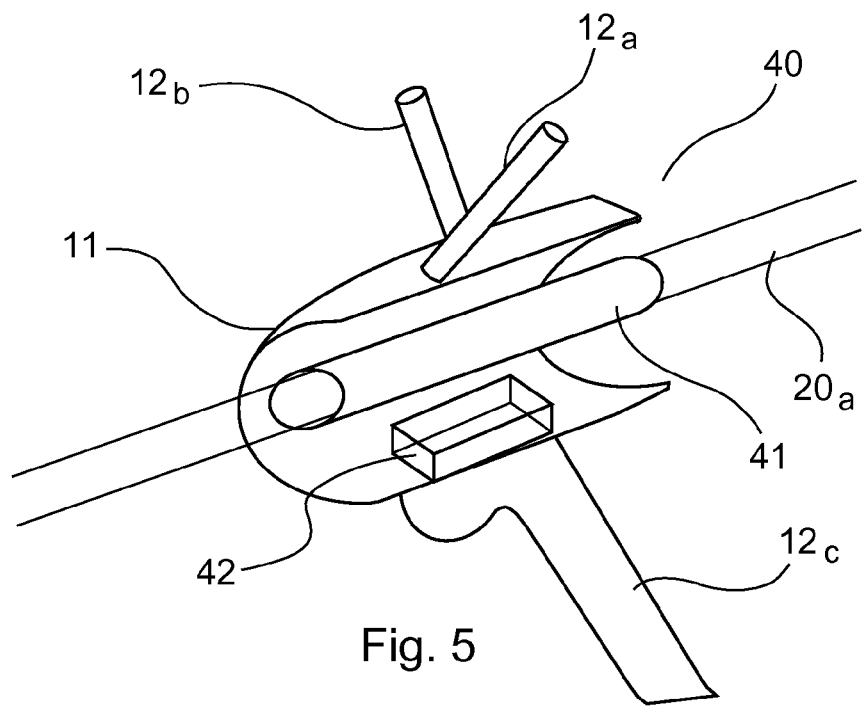
Figure 6:
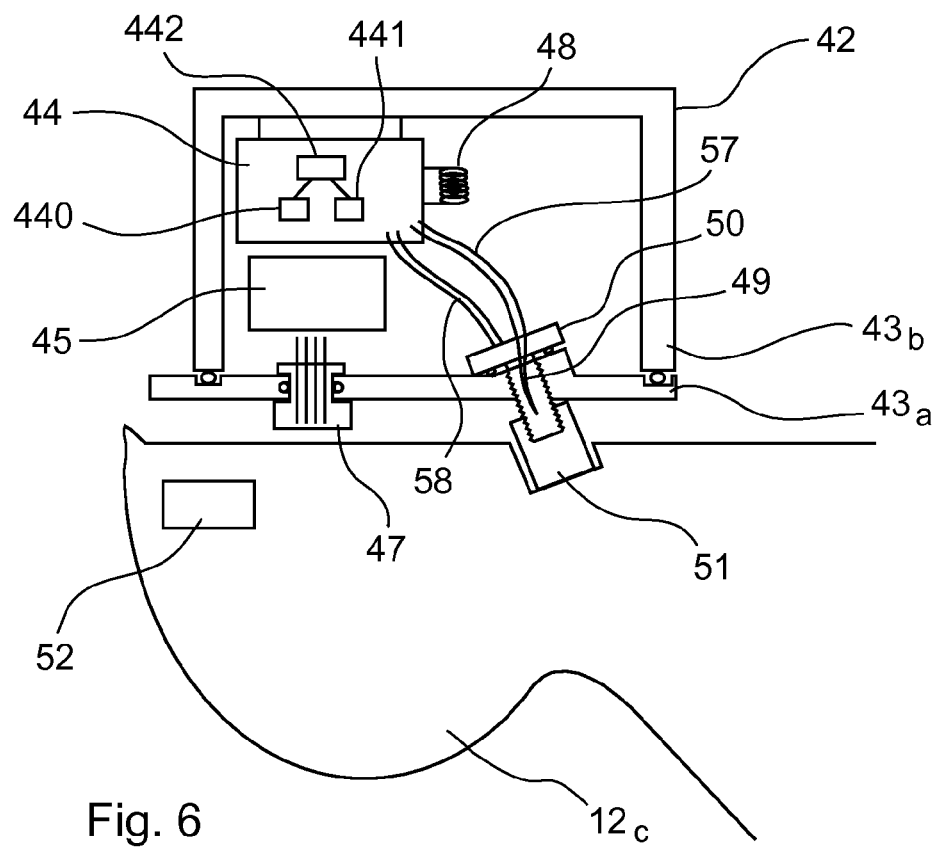
Figure 7:
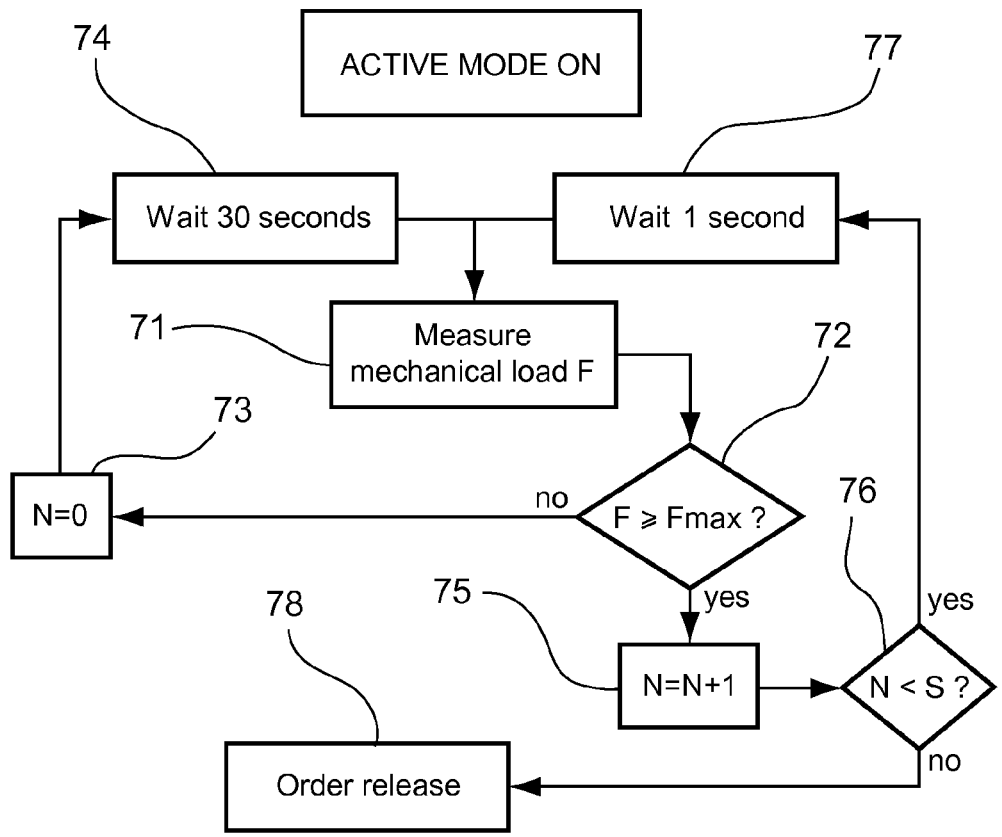
Figure 8:
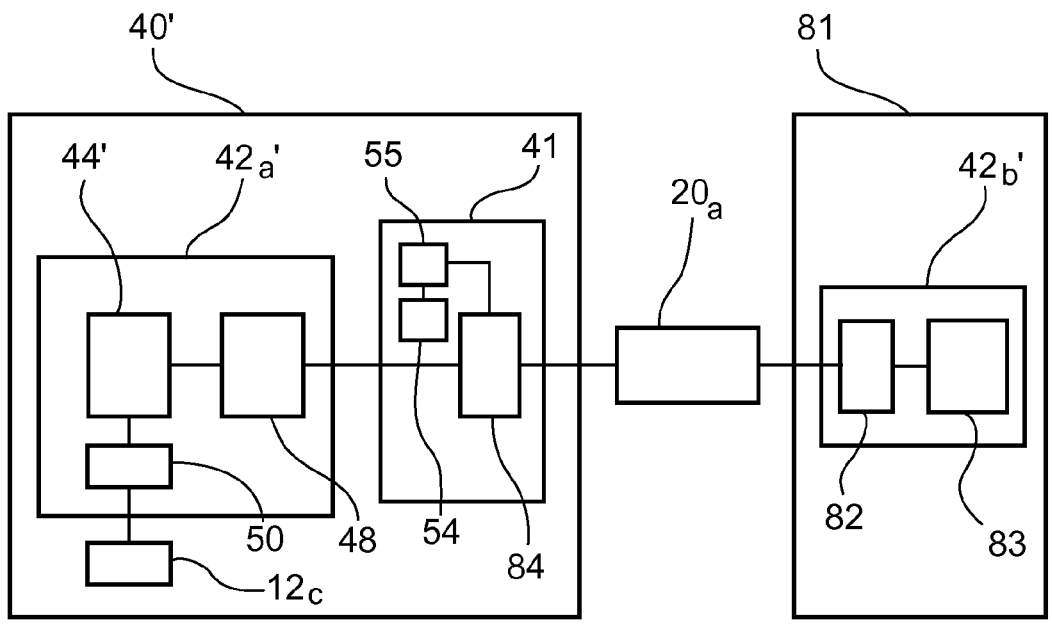

Other features and advantages of embodiments of the disclosure shall appear from the following description, given by way of an indicative and non-exhaustive examples and from the appended drawings, of which:

FIG. 1, already described with reference to the prior art, presents an example of network of seismic streamers towed by a seismic vessel;

FIG. 2, already described with reference to the prior art, illustrates in detail the block referenced C in FIG. 1 (i.e. a portion of the streamer);

FIG. 3, already described with reference to the prior art, is a perspective view of a known bird;

FIG. 4 provides a schematic illustration of a bird, a wing releasing system and an operation managing system according to a first embodiment of the disclosure;

FIGS. 5 and 6 provide partial views (schematic perspective view and schematic side view respectively) of the bird, the wing releasing system and the operation managing system according to the first embodiment of FIG. 4;

FIG. 7 is a flowchart of an algorithm implemented by the releasing decision circuit shown in FIGS. 4 and 6;

FIG. 8 provides a schematic illustration of a bird, a wing releasing system and an operation managing system according to a second embodiment of the disclosure.

5. DETAILED DESCRIPTION

In all of the figures of the present document, identical elements and steps are designated by the same numerical reference sign.

FIGS. 1 to 3, which relate to the prior art, have already been described above and are not discussed again.

We now present, in relation to FIGS. 4, 5 and 6, a bird 40, a wing releasing system 42 and an operation managing system 55, according to a first embodiment of the disclosure.

The bird 40 comprises:
- an inline module 41 placed in series along the streamer 20a and comprising a magnetic sensor 54 (like a magnetometer, a compass or a hall sensor) and electronics 55. As an inline module of the prior art, it provides depth control and lateral control (steering). Its additional features, forming an operating managing system 55 according to a particular embodiment of the disclosure, are described below;
- a body (tubular frame element) 11, freely rotating around the module 41. A swivel (not shown) can be used to ease rotation of the body 11 around the inline modules 41, under tension;
- wings attached to the body: two motorized upper wings 12a, 12b and a lower non-motorized wing (keel) 12c. When released (as detailed below), the lower wing 12c is retained by a rope 53 attached to the body 11. The lower wing 12c has an embedded magnet 52.

In the first embodiment, the wing releasing system is a wing releasing device 42, which is inside the body 11 and used to release the lower wing 12c from the body 11, when it detects that a foreign object (e.g. a fishing net) is caught by the lower wing 12c. In an alternative embodiment, the wing releasing device is inside the lower wing 12c, or any wing to release. In another alternative embodiment, the wing releasing device is inside the inline module 41.

In the first embodiment, the wing releasing device 42 comprises a small size watertight housing (composed of a base 43a and a lid 43b) which contains:

electronics 44, comprising signal processing means (with programmable settings to limit false detections related to deployment/recovery in high seas, workboat operations, back deck operations, maintenance and storage), for performing the function of a releasing decision circuit, i.e. for deciding whether a foreign object (e.g. a fishing net) is caught by the lower wing 12c (as detailed below). The electronics 44 is also referred to as "releasing decision circuit" comprising different means (means for obtaining at least one measure of a parameter representative or related to a load applied on at least one wing; means for deciding, automatically or through a man-machine interface, whether a foreign object is caught by said at least one wing, based on said at least one measure; and means for generating a release request signal if the means for deciding have decided that a foreign object is caught). It generates the release request signal (to activate an actuator 50), e.g. as a function of a load signal (generated by a load sensor 49). Electronics 44 can comprise an embedded memory 440 to log events, record load cases and finally continuously improve the system;

a main battery 45 and an auxiliary battery 46 (e.g. low aging at 50° C., high power density, rechargeable);

a watertight connector 47;

a wireless communication circuit 48 (typically using RFID, NFC, Zigbee, Bluetooth or wifi), for communication between the electronics 44 and the inline module 41 (e.g. to transmit a signal indicating the release of the lower wing, in an alternative embodiment without the wireless magnetic feedback detailed below), and/or between the electronics 44 and back deck of a seismic vessel (to perform deployment tests, to set quickly new parameters, . . . ). In an alternative embodiment described below with FIG. 8, the wireless communication circuit 48 is used to receive a release request signal from a management system on board the vessel 21;

the load sensor 49 (e.g. mechanical or optical), for generating a load signal representative of a load applied on the lower wing 12c. It is electrically connected to the electronics 44 by a link 57. It is for example a strain gage with pulsed power (to reduce consumption), fixed on the body and/or the lower wing 12c (not in direct contact with sea for robustness and avoid corrosion) and low consuming. In an alternative embodiment, the load sensor is a strain gauge of the spring type; and the actuator 50, for releasing the lower wing 12c from the body 11, when receiving the release signal generated by the electronics 44. The actuator 50 is electrically connected to the electronics 44 by a link 58 (on which the release request signal is transmitted), and attached to the shaft 51 of the lower wing 12c. The actuator is for example an electromagnet, a piston, an inflatable bag, a frangible bolt, a pyromechanism, etc.). In a particular embodiment, it is compact, low powered and not in contact with sea water for robustness and corrosion.

The watertight connector 47 is watertight even in open face. It is connected to the electronics 44, the actuator 50, the main battery 45, the auxiliary battery 46 and the ground 56, and comprises means for cooperation with a shunting dongle 59, a passing dongle 60 or a bench 61. During transportation, the shunting dongle 59 is screwed to the watertight connector 47, in order to deactivate (shortcut) the actuator 50 and disconnect (open) the main battery 45 from the electronics 44. At sea, the passing dongle 60 is screwed to the watertight connector 47, in order to activate the actuator 50 and connect the main battery 45 to the electronics 44. On-board (on the back deck of the seismic vessel 21), the watertight connector 47 is connected to the bench 61, in order to deactivate the actuator 50, charge the main battery 45 (via a power line) and exchange data with the electronics 44 (via a serial port) (e.g. for downloading new firmware and retrieve data).

We now describe the operation of the wing releasing device 42. When a fishing net (or any other foreign object) hits the lower wing 12c, drag applied to it increases and generates deflection of materials. The mechanical load sensor 49 (e.g. strain gage) is elongating accordingly and its resistance is evolving proportionally to the mechanical load. As shown in FIG. 7, an algorithm is implemented by the electronics 44 (i.e. the "releasing decision circuit"). In step 71, the electronics 44 receives from the mechanical load sensor 49 a measure of the mechanical load F. In test step 72, the electronics 44 compares this measure F with a threshold Fmax. In case of negative answer (i.e. if F<Fmax), the process goes to step 73, in which the counter N is set to 0, and then to step 74, which is a waiting step of 30 seconds, before returning to step 71. In case of affirmative answer, the process goes to step 75, in which the counter N is incremented by one, and then to test step 76, in which the electronics 44 compares N with a threshold (e.g. equal to 5). If N<5, then the process goes to step 77, which is a waiting step of 1 second, before returning to step 71. Otherwise, the process goes to step 78, in which the release request signal is generated (it is used to order the actuator 50 to release the lower wing 12c and associated shaft 5).

In the first embodiment described above, the electronics 44 ("releasing decision circuit") generates automatically a release request signal (used to activate an actuator 50), as a function of a load signal generated by a load sensor 49. Alternative embodiments are possible since the electronics 44 ("releasing decision circuit") can generate the release request signal as a function of other types of measures, provided that these measures concern a parameter representative or related to a load applied on a wing. For example, it is possible any of the followings measures (this list is not exhaustive):

measures of a noise on data from one or several hydrophones (16) distributed along the streamer 20a (these measures are visible directly from the seismic traces derived from the hydrophones; a wing release decision can be made by analyzing these seismic traces, visually (by an operator who provides his decision via a man-machine interface) or even from a suitable algorithm (with template for example) in the case of an automatic solution);

measures of a noise on the streamer 20a (these measures are obtained by load sensors placed along the cable, ideally in the vicinity of the birds, in order to measure an elongation or a shrinkage of the cable: e.g. elongation if a foreign object (e.g. a fishing net) does not tangle with the cable but is only pulled by the bird, and shrinkage (narrowing) if the fishing net wraps around the bird);

measures of a motor consumption of at least one motorized wing 12a,12b;

. . . .

Also, in alternative embodiments, when the releasing decision circuit is comprised in a management system on board a vessel (see FIG. 8 described below), it can generate the release request signal either automatically or not. In the second case, an operator on board the vessel is provided with the measures (which are e.g. displayed on a screen), decides whether a foreign object is caught by the wing, and provides his decision (through a man-machine interface) to the releasing decision circuit which then generates the release request signal (if the operator has decided that a foreign object is caught).

We now describe the operation of the inline module 41. The magnetic sensor 54 (e.g. magnetometer) measures the whole magnetic field created by the environment, including: Earth magnetic field, magnetic field generated by the electronics 55, wires inside the inline module 41 and magnetic field generated by the magnet 52 situated inside the lower wing 12c. When the lower wing 12c is released (see above description of the operation of the wing releasing device 42), its magnet 52 moves far away from the magnetic sensor 54, the magnetic sudden change is detected as follows.

The electronics 55 carries out several functions (each of these functions can be seen like a specific circuit of an operation managing system):

first function ("wing loss decision circuit"): it processes data coming from the magnetic sensor 54 and detects the change related to the released wing 12c (i.e. a wireless magnetic feedback is used to give status of presence/absence of the lower wing 12c). When the change is detected, it generates a wing loss signal (also referred to as "absence signal");

second function ("alarm circuit"): it raises and sends an alarm (absence signal) to a management system onboard the seismic vessel, so that the operator is informed that the lower wing 12c has been released;

third function ("driving circuit"): when receiving the wing loss signal, it drives the bird according to a degraded operating mode, by adapting the behaviour of the two motorized upper wings 12a and 12b. By adjusting the upper wings at the same angle of attack, twisting is reduced or removed. If twisting is removed, then all hydrodynamic forces are used to lift the streamer and so maintain a target vertical depth. In other words, when the lower non-motorized wing 12c is released, the driving circuit acts on the two motorized upper wings 12a, 12b to keep them symmetrical with respect to a longitudinal axis of the body 11 and to control the depth of the streamer 20a.

In an alternative embodiment (without wireless magnetic feedback) of the first function, the electronics 55 receives (from the electronics 44, via the radiocommunication means 48) a release information signal indicating the release of the lower wing 12c.

In an alternative embodiment, the degraded operating mode is defined as follows, when one of the two motorized upper wings 12a, 12b is released: the driving circuit (electronics 55) acts on the other of the two motorized upper wings to control the depth of the streamer 20a and to control an angle of attack at 0°, relative to a flow of water.

In a particular embodiment, electronics 44 (comprised in the wing releasing device 42) and electronics 55 (comprised in the inline module 41) each comprise a read-only memory (ROM) 440, 550, a random access memory (RAM) 441, 551 and a processor 442, 552. The read-only memory 440, 550 is a non-transitory computer-readable carrier medium. It stores executable program code instructions, which are executed by the processor 442, 552 in order to enable implementation of the functions described above (see also FIG. 7 for the function executed by the electronics 44 comprised in the wing releasing device 42). Upon initialization, the aforementioned program code instructions are transferred from the read-only memory 440, 550 to the random access memory 441, 551 so as to be executed by the processor 442, 552. The random access memory 441, 551 likewise includes registers for storing the variables and parameters required for this execution.

All the steps of the methods executed by electronics 55 and electronics 44 can be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

Although the present disclosure has been described with reference to one or more examples, workers skilled in the art will recognize that changes may be made in form and detail without departing from the scope of the disclosure and/or the appended claims.

The proposed solution is not limited to the release of the lower wing 12c, and can be implemented with one or several wings (among the set of wings of the birds).

The proposed solution is not limited to the release of wing or wings of birds of the third type (e.g. Sercel's product called "Nautilus®"). Notably, it can also be implemented with birds of the first type ("Bird In Line"), i.e. when the body of the bird comprises a module placed in series along the streamer, and in that case the releasing decision circuit is comprised in the module or in one or several of the wings.

We now present, in relation to FIG. 8, a bird 40', a wing releasing system 42a', 42b' and an operation managing system 55 according to a second embodiment of the disclosure.

The bird 40' of the second embodiment differs from the bird 40 of the first embodiment (see FIG. 4) in that the electronics (referenced 44' in FIG. 8) still provides the release request signal to the actuator 50 (for releasing the lower wing 12c), but does not generate it. In other words, the electronics 44' does not perform the function of the releasing decision circuit. The releasing decision circuit 83 is comprised in a management system 81, on board the vessel 21.

More precisely, the wing releasing system comprises:

a first part 42b' (in the management system 81 on board the vessel (21) comprising the releasing decision circuit 83 and a transmitting circuit 82 (for transmitting the release request signal to the bird 40', via the streamer 20a); and a second part 42a' (in the bird 40') comprising the electronics 44', the actuator 50, the wireless communication circuit 48 (for receiving the release request signal, via the streamer 20a and a receiving circuit 84 comprised in the inline module 41).

The releasing decision circuit 83, comprised in the management system on board the vessel, can generate the release request signal either automatically (as the electronics 44 in the embodiment of FIG. 4) or not. In the second case, an operator on board the vessel is provided with the measures (which are e.g. displayed on a screen), decides whether a foreign object is caught by the wing, and provides his decision (through a man-machine interface) to the releasing decision circuit 83 which then generates the release request signal (if the operator has decided that a foreign object is caught).

At least one embodiment of the disclosure provides a technique allowing to protect (i.e. maintain the integrity) of the equipment (streamer, bird) in presence of fishing nets (or any inconvenient foreign objects).

At least one embodiment of the disclosure provides a technique allowing to maintain at least partially the lateral and/or vertical (depth) control of the streamer.

At least one embodiment of the disclosure provides a technique which is reliable.

At least one embodiment of the disclosure provides a technique in which the navigation control device (bird) is autonomous.

At least one embodiment of the disclosure provides a technique which is cost efficient.

The invention claimed is:

1. A navigation control device, also referred to as a bird, placed along a towed acoustic linear antenna, the navigation control device being adapted for controlling depth and/or lateral position of the towed acoustic linear antenna and comprising:
   a body to which is attached at least one wing;
   a releasing decision circuit, carried with the body along the acousting linear antenna, which is configured to detect that a foreign object is caught by said at least one wing and generate a release request signal when a caught foreign object is detected; and
   an actuator, which releases from the body said at least one wing, when receiving said release request signal.

2. The navigation control device according to claim 1, wherein said releasing decision circuit comprises:
   means for obtaining at least one measure of a parameter representative or related to a load applied on said at least one wing;
   means for deciding, automatically, whether a foreign object is caught by said at least one wing, based on said at least one measure; and
   means for generating the release request signal if said means for deciding have decided that a foreign object is caught.

3. The navigation control device according to claim 2, wherein said means for deciding comprise a signal processor, with programmable settings.

4. The navigation control device according to claim 2, wherein said at least one measure belongs to the group consisting of:
   measures, from a load sensor comprised in the navigation control device, of a load applied on said at least one wing;
   measures of a noise on data from one or several hydrophones distributed along the towed acoustic linear antenna;
   measures of a noise on the towed acoustic linear antenna; and
   measures of a motor consumption of the at least one wing.

5. The navigation control device according to claim 1, comprising a module placed in series along the towed acoustic linear antenna, said body freely rotating around said module, wherein said releasing decision circuit is comprised in said body, in said module or in said at least one wing.

6. The navigation control device according to claim 1, the body comprising a module placed in series along the towed acoustic linear antenna, wherein said releasing decision circuit is comprised in said module or in said at least one wing.

7. The navigation control device according to claim 1, wherein the device comprises a main battery, powering the releasing decision circuit and the actuator.

8. The navigation control device according to claim 7, wherein said releasing decision circuit, said actuator and said main battery are contained in a watertight housing comprising a watertight connector, and said watertight connector is connected to said releasing decision circuit, said actuator and said main battery, and comprises means for cooperation with:
   a shunting dongle, in order to deactivate the actuator and disconnect the main battery from the releasing decision circuit;
   a passing dongle, in order to activate the actuator and connect the main battery to the releasing decision circuit;
   a bench, in order to deactivate the actuator, charge the main battery and exchange data with the releasing decision circuit.

9. The navigation control device according to claim 1, wherein the releasing decision circuit comprises an embedded memory configured to log events and record load cases.

10. A method for releasing at least one wing of a navigation control device, also referred to as bird, placed along a towed acoustic linear antenna, adapted for controlling the depth and/or the lateral position of the towed acoustic linear antenna, the navigation control device comprising a body to which is attached the at least one wing, the method comprising the following acts by the navigation control device:
   detecting that a foreign object is caught by the at least one wing, by a releasing decision circuit comprised in the navigation control device and carried with the body along the acousting linear antenna;
   generating a release request signal by the releasing decision circuit, when a caught foreign object is detected; and
   releasing from the body said at least one wing, using an actuator comprised in the navigation control device, when said release request signal is generated.

* * * * *